United States Patent
Du et al.

(10) Patent No.: US 10,816,392 B2
(45) Date of Patent: *Oct. 27, 2020

(54) METHOD AND APPARATUS FOR OBTAINING VIBRATION INFORMATION AND USER EQUIPMENT

(71) Applicant: BEIJING ZHIGU RUI TUO TECH CO., LTD., Beijing (CN)

(72) Inventors: Lin Du, Beijing (CN); Hanning Zhou, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 752 days.

This patent is subject to a terminal disclaimer.

(21) Appl. No.: 15/526,186

(22) PCT Filed: Oct. 10, 2015

(86) PCT No.: PCT/CN2015/091647
§ 371 (c)(1),
(2) Date: May 11, 2017

(87) PCT Pub. No.: WO2016/078485
PCT Pub. Date: May 26, 2016

(65) Prior Publication Data
US 2017/0314988 A1    Nov. 2, 2017

(30) Foreign Application Priority Data
Nov. 17, 2014   (CN) .......................... 2014 1 0652877

(51) Int. Cl.
*G10H 1/043*    (2006.01)
*G01S 5/22*     (2006.01)
(Continued)

(52) U.S. Cl.
CPC ............... *G01H 11/06* (2013.01); *G01H 9/00* (2013.01)

(58) Field of Classification Search
CPC .......... G01H 9/00; G01H 3/125; G01S 15/06; H04R 23/008; A61B 2034/2051
(Continued)

(56) References Cited

U.S. PATENT DOCUMENTS

| 6,240,051 B1 | 5/2001 | Bunks |
| 7,134,343 B2 | 11/2006 | Suzuki et al. |

(Continued)

FOREIGN PATENT DOCUMENTS

| CN | 1433663 | 7/2003 |
| CN | 1578540 | 2/2005 |

(Continued)

OTHER PUBLICATIONS

International Search Report and Written Opinion for Application No. PCT/CN2015/091647, dated Jan. 8, 2016, 10 pages.
(Continued)

*Primary Examiner* — George C Monikang
(74) *Attorney, Agent, or Firm* — Sheppard Mullin Richter & Hampton LLP (57) ABSTRACT

Embodiments of the present application disclose a method and an apparatus for obtaining vibration information and user equipment. The method comprises: obtaining at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; analyzing the at least one reflected electromagnetic wave signal to obtain at least one piece of vibration information corresponding to the at least one reflected electromagnetic wave signal. In technical solutions of the embodiments of the present application, by obtaining and analyzing the reflected electromagnetic wave
(Continued)

Obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment — S110

Analyze the at least one reflected electromagnetic wave signal to obtain at least one piece of vibration information corresponding to the at least one reflected electromagnetic wave signal — S120 signal, the sound vibration at the electromagnetic wave reflective module in the environment may be restored, and obtaining sound information in an environment by using a wireless electromagnetic wave is especially applicable to some scenarios where an active component is not suitable for use at a sound collecting location and a scenario where sound information at multiple locations needs to be collected in a space.

22 Claims, 7 Drawing Sheets

(51) Int. Cl.
 *G01H 11/06* (2006.01)
 *G01H 9/00* (2006.01)
(58) Field of Classification Search
 USPC ...................................... 367/128; 381/56, 62
 See application file for complete search history.

(56) References Cited

U.S. PATENT DOCUMENTS

| | | | |
|---|---|---|---|
| 7,391,976 | B2 | 6/2008 | Kobayashi et al. |
| 7,397,421 | B2 | 7/2008 | Smith |
| 8,599,649 | B1 | 12/2013 | Antonelli |
| 8,982,669 | B2 | 3/2015 | Barthel et al. |
| 2005/0265124 | A1 | 12/2005 | Smith |
| 2011/0063179 | A1* | 3/2011 | Guler ................... H01Q 19/175 343/766 |
| 2011/0175766 | A1 | 7/2011 | Peczalski |
| 2012/0293356 | A1* | 11/2012 | Barthel ................... G01S 7/539 342/27 |
| 2014/0197510 | A1* | 7/2014 | Ho .................... H01L 31/02322 257/432 |

FOREIGN PATENT DOCUMENTS

| | | |
|---|---|---|
| CN | 102141430 | 8/2011 |
| CN | 102299753 | 12/2011 |
| CN | 102713667 | 10/2012 |
| CN | 103048103 | 4/2013 |
| CN | 103364068 | 10/2013 |
| CN | 103557927 | 2/2014 |
| CN | 203606023 | 5/2014 |
| CN | 104374463 | 2/2015 |
| CN | 104374464 | 2/2015 |
| JP | 2009-005144 | 1/2009 |

OTHER PUBLICATIONS

Liu et al., "Ambient Backscatter: Wireless Communication Out of Thin Air," SIGCOMM, Aug. 2013, p. 27-38.

Pu et al., "Whole-Home Gesture Recognition Using Wireless Signals," In Proceedings of the 19th Annual International Conference on Mobile Computing & Networking (MobiCom '13), ACM, 2013, p. 27-38.

Wang et al., "We Can Hear You with Wi-Fi!," In Proceedings of the 20th Annual International Conference on Mobile Computing and Networking (MobiCom '14), ACM, 2014, p. 593-604.

* cited by examiner

METHOD AND APPARATUS FOR OBTAINING VIBRATION INFORMATION AND USER EQUIPMENT

CROSS-REFERENCE TO RELATED APPLICATIONS

This application is a National Phase Application of International Application No. PCT/CN2015/091647, filed on Oct. 10, 2015, which claims the benefit of priority to Chinese Patent Application No. 201410652877.9, filed on Nov. 17, 2014, and entitled "Method and Apparatus for Obtaining Vibration Information and User Equipment", each of which is incorporated into the present application by reference herein in its entirety.

TECHNICAL FIELD

The present application relates to a sound detection technology, and in particular, to a method and an apparatus for obtaining vibration information, and user equipment.

BACKGROUND

In some video recording, audio recording, and monitoring scenarios, sound information in an environment needs to be collected. For example, a microphone may be used to perform sound information collection. The microphone usually converts, by a diaphragm, a sound vibration in the air to a vibration of the diaphragm, and then to a change of a current signal by a transducer.

SUMMARY

A possible objective of embodiments of the present application is to provide a sound detection solution.

In a first aspect, a possible implementation solution of the present application provides a method for obtaining vibration information, comprising:

obtaining at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and analyzing the at least one reflected electromagnetic wave signal to obtain at least one piece of vibration information corresponding to the at least one reflected electromagnetic wave signal.

In a second aspect, a possible implementation solution of the present application provides an apparatus for obtaining vibration information, comprising:

a reflected signal obtaining module, configured to obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and an analyzing and processing module, configured to analyze the at least one reflected electromagnetic wave signal to obtain at least one piece of vibration information corresponding to the at least one reflected electromagnetic wave signal.

In a third aspect, a possible implementation solution of the present application provides user equipment, comprising the foregoing apparatus for obtaining vibration information.

In a fourth aspect, a possible implementation solution of the present application provides a computer readable storage device comprising executable instructions that, in response to execution, cause a device comprising a processor to perform operations, comprising:

obtaining at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and analyzing the at least one reflected electromagnetic wave signal to obtain at least one piece of vibration information corresponding to the at least one reflected electromagnetic wave signal.

In at least one implementation solution of the embodiments of the present application, by obtaining and analyzing the reflected electromagnetic wave signal, the sound vibration at the electromagnetic wave reflective module in the environment may be restored, and obtaining sound information in an environment by using a wireless electromagnetic wave is especially applicable to some scenarios where an active component is not suitable for use at a sound collecting location and a scenario where sound information at multiple locations needs to be collected in a space.

DETAILED DESCRIPTION

Specific implementations of the present application are further described in detail below with reference to the accompanying drawings (in which like elements are denoted by like reference numerals) and embodiments. The following embodiments are intended to describe the present application, but not to limit the scope of the present application.

A person skilled in the art may understand that the terms in the present application such as "first", "second", and the like are only used to differentiate different steps, devices, or modules, and the like, and represent neither any specific technical meaning nor a certain logic sequence between them.

In the following description of the embodiments of the present application, the "sound" is not limited to the sound within the human hearing range, and any sound that may cause the electromagnetic wave reflective module to vibrate may be comprised in the protection scope of the present application.

Figure 1:
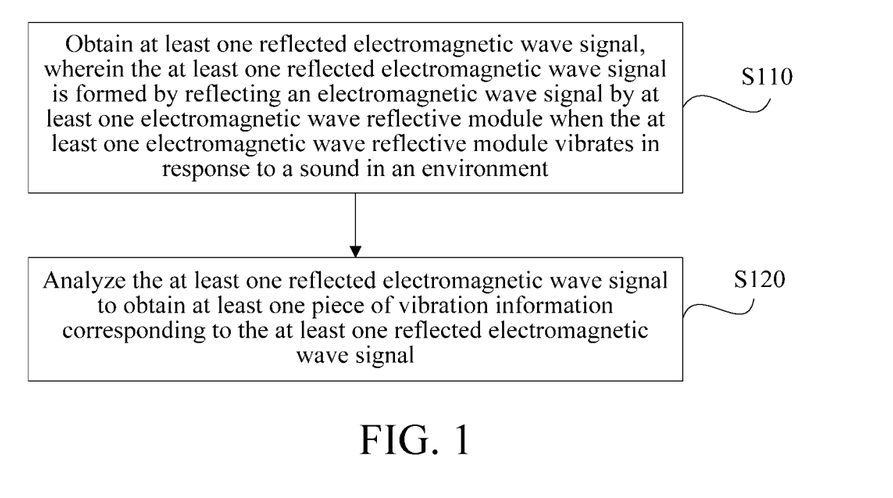
FIG. 1 is a schematic flowchart of a method for obtaining vibration information, according to an embodiment of the present application.

As shown in FIG. 1, an embodiment of the present application provides a method for obtaining vibration information, comprising:

S110: obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and S120: analyze the at least one reflected electromagnetic wave signal to obtain at least one piece of vibration information corresponding to the at least one reflected electromagnetic wave signal.

For example, as an entity for executing the embodiment, an apparatus for obtaining vibration information provided in the present application executes S110 and S120. Specifically, the apparatus for obtaining vibration information may be set in user equipment by means of software, hardware, or a combination of software and hardware, or the apparatus for obtaining vibration information itself is the user equipment; and the user equipment comprises, but is not limited to, a smart phone, a computer, a tablet, a home gateway, and the like.

In at least one implementation solution of the embodiments of the present application, by obtaining and analyzing the reflected electromagnetic wave signal, the sound vibration at the electromagnetic wave reflective module in the environment may be restored, and obtaining sound information in an environment by using a wireless electromagnetic wave is especially applicable to some scenarios where an active component is not suitable for use at a sound collecting location and a scenario where sound information at multiple locations needs to be collected in a space.

Steps of the embodiment of the application are further described by using the following implementations.

In a possible implementation, the method further comprises:

forming, when the at least one electromagnetic wave reflective module vibrates in response to the sound in the environment, the at least one reflected electromagnetic wave signal by reflecting the electromagnetic wave signal by the at least one electromagnetic wave reflective module.

In the implementation of the present application, in one aspect, the electromagnetic wave reflective module can vibrate in response to the sound in the environment, and in another aspect, the electromagnetic wave reflective module can reflect the electromagnetic wave signal. An electromagnetic wave reflective surface of the electromagnetic wave reflective module may reflect the electromagnetic wave signal while vibrating, and because the sound causes a mechanical vibration of the electromagnetic wave reflective surface, according to the Doppler's principle, the vibration changes a spectrum characteristic of the reflected electromagnetic wave signal, so that a signal with a frequency modulation characteristic is formed.

In a possible implementation, in an application scenario where sounds need to be collected, the electromagnetic wave reflective module may be set at a location where sounds need to be collected to reflect the electromagnetic wave signal.

In a possible implementation, the electromagnetic wave reflective module can be an electromagnetic wave reflective film for example.

In a possible implementation, in order to obtain a corresponding electromagnetic wave reflective characteristic, a printed antenna is also disposed on the electromagnetic wave reflective film.

In a possible implementation, the electromagnetic wave reflective film can be a metallic film for example. In other possible implementations, the electromagnetic wave reflective film can be a film of another material, and the printed antenna is disposed on the reflective surface.

In a possible implementation, the reflecting comprises directional reflecting. That is, directional reflecting the reflected electromagnetic wave signal to a location where a receiving end of the reflected electromagnetic wave signal is located.

In a possible implementation, the directional reflecting can be implemented by using a shape of the electromagnetic wave reflective module. For example, in a possible implementation, the electromagnetic wave reflective module can be an electromagnetic wave reflective film with a reflective surface having a curved surface, and the receiving end of the reflected electromagnetic wave signal is located at a reflection convergence region of the curved surface. In a possible implementation, the curved surface can be a paraboloidal or ellipsoidal surface.

In a possible implementation, the electromagnetic wave signal comprises an environmental electromagnetic wave signal such as a radio wave, an optical signal, and the like in an environment. That is, in the implementation, there is no need to emit other electromagnetic wave signal for reflecting, and the reflected electromagnetic wave signal can be formed by reflecting the existing environmental electromagnetic wave signal in the environment. A person skilled in the art may see that, in the implementation, existing electromagnetic field information in the space can be reused and there is no need to emit an electromagnetic signal.

In another possible implementation, the electromagnetic wave signal comprises a modulated electromagnetic wave signal modulated by an orbital angular momentum. A person skilled in the art may know that, after a reflection, the angular momentum of the modulated electromagnetic wave signal changes, so the reflected electromagnetic wave signal comprises an electromagnetic wave component conjugated with the angular momentum of the modulated electromagnetic wave signal. In some implementations, a receiving end of the reflected electromagnetic wave signal receives not only the reflected electromagnetic wave signal but also the environmental electromagnetic wave signal and some source electromagnetic wave signals emitted by an emitting end of the modulated electromagnetic wave signal, and by using a characteristic of the modulated electromagnetic wave signal (after a reflection, the angular momentum of the modulated electromagnetic wave signal changes), only the electromagnetic wave component is obtained, so that interference brought by the source signals of the emitting end is avoided.

S110: Obtain the at least one reflected electromagnetic wave signal.

In a possible implementation, for example, the at least one reflected electromagnetic wave signal can be received by the receiving end of the reflected electromagnetic wave signal described above.

In another possible implementation, the at least one reflected electromagnetic wave signal can be obtained from an external device (for example, the receiving end described above) by using a communications module.

S120: Analyze the at least one reflected electromagnetic wave signal to obtain at least one piece of vibration information corresponding to the at least one reflected electromagnetic wave signal.

In a possible implementation, by using changes of spectrum distribution of the at least one reflected electromagnetic wave signal, the vibration information of the electromagnetic wave reflective module can be restored by utilizing a classic frequency modulation and demodulation method or a machine learning method.

A person skilled in the art may know that, sound information at a location where the electromagnetic wave reflective module is located can be restored according to the vibration information.

In a possible implementation, the receiving end can receive multiple reflected electromagnetic wave signals reflected by multiple electromagnetic wave reflective modules. In order to distinguish the multiple reflected electromagnetic wave signals, electromagnetic wave reflective characteristics of the multiple electromagnetic wave reflective modules are different. For example, the different electromagnetic wave reflective characteristics can be obtained by using patterns of the printed antenna described above.

After the multiple reflected electromagnetic wave signals are obtained, the electromagnetic wave reflective modules respectively corresponding to the multiple reflected electromagnetic wave signals can be determined according to spectrum locations of the multiple reflected electromagnetic wave signals and the electromagnetic wave reflective characteristics respectively corresponding to the multiple electromagnetic wave reflective modules, so that vibration information of locations where each electromagnetic wave reflective module is located can be obtained.

In the implementation, the step S120 comprises:
analyzing the multiple reflected electromagnetic wave signals to obtain multiple pieces of vibration information corresponding to the multiple locations.

In a possible implementation, the multiple electromagnetic wave reflective modules correspond to multiple different locations, and at this time, by using the foregoing implementation of the embodiment of the present application, vibration information at the multiple locations can be obtained by using one receiving end, and then sounds at the multiple locations are obtained.

By comparing the foregoing implementation and a traditional implementation such as collecting sounds at multiple locations using multiple microphones, after the multiple electromagnetic wave reflective modules are separately set at multiple locations where sounds need to be collected, only one receiving end is required to obtain the vibration information of the different locations.

It is difficult for an individual electromagnetic wave reflective film to have vibration responses to sounds within a wide frequency range, so in a possible implementation, the at least one electromagnetic wave reflective module comprises at least one electromagnetic wave reflective array. The following describes the implementation by using an example of which the at least one electromagnetic wave reflective module comprises at least one electromagnetic wave reflective array.

In the implementation, the electromagnetic wave reflective array comprises multiple reflective units with different vibration response characteristics respectively, and each reflective unit reflects a corresponding reflected electromagnetic wave sub-signal to the receiving end, and the multiple reflected electromagnetic wave sub-signals respectively reflected by the multiple reflective units constitute a group of array reflected electromagnetic wave signals.

In a possible implementation, for example, the multiple reflective units may vibrate in response to sounds within different frequency ranges respectively, that is, each reflective unit vibrates in a sound frequency range.

In the implementation, the step S120 can comprise:
analyzing the group of array reflected electromagnetic wave signals to obtain multiple pieces of vibration component information respectively corresponding to the multiple reflected electromagnetic wave sub-signals.

For example, when the multiple reflective units respectively correspond to sounds within multiple different spectrum ranges, the multiple pieces of vibration component information respectively correspond to components within different frequency ranges of the sound in the environment.

In a possible implementation, the step S120 can further comprise: obtain, according to the multiple pieces of vibration component information, synthesized vibration information of the sound located at the electromagnetic wave reflective array.

By using the implementation, the sound in the environment can be restored more completely in a wider frequency range, which results in better effect of the restored sound.

A person skilled in the art may understand that, in the foregoing methods of the specific implementations of the present application, the value of the serial number of each step does not mean an execution sequence, and the execution sequence of each step should be determined according to the function and internal logic thereof, and should not be any limitation to the implementation procedure of the specific implementations of the present application.

Figure 2:
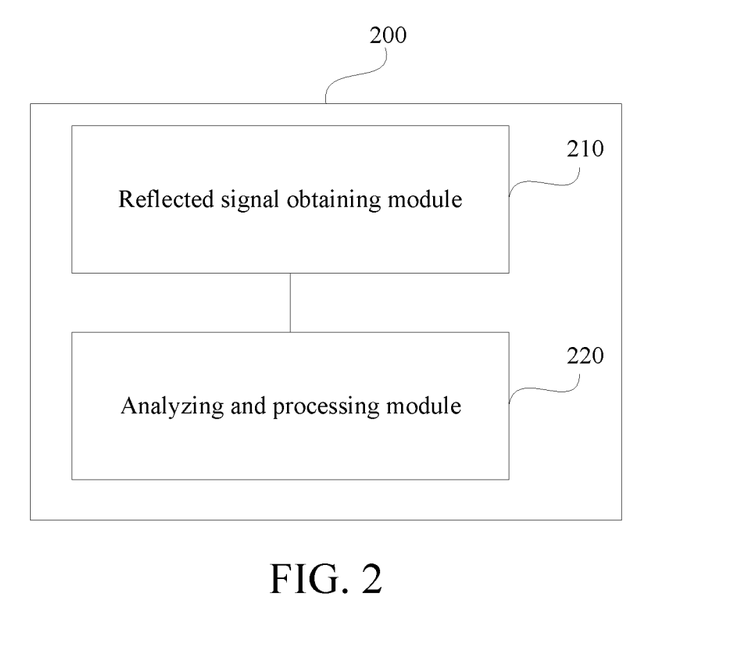
FIG. 2 is a schematic structural block diagram of an apparatus for obtaining vibration information, according to an embodiment of the present application.

As shown in FIG. 2, an embodiment of the present application provides an apparatus 200 for obtaining vibration information, comprising:

a reflected signal obtaining module 210, configured to obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and an analyzing and processing module 220, configured to analyze the at least one reflected electromagnetic wave signal to obtain at least one piece of vibration information corresponding to the at least one reflected electromagnetic wave signal.

In at least one implementation solution of the embodiments of the present application, by obtaining and analyzing the reflected electromagnetic wave signal, the sound vibration at the electromagnetic wave reflective module in the environment can be restored, and obtaining sound information in an environment by using a wireless electromagnetic wave is especially applicable to some scenarios where an active component is not suitable for use at a sound collecting location and a scenario where sound information at multiple locations needs to be collected in a space.

Modules and units of the embodiment of the present application are further described by using the following implementations.

Figure 3A:
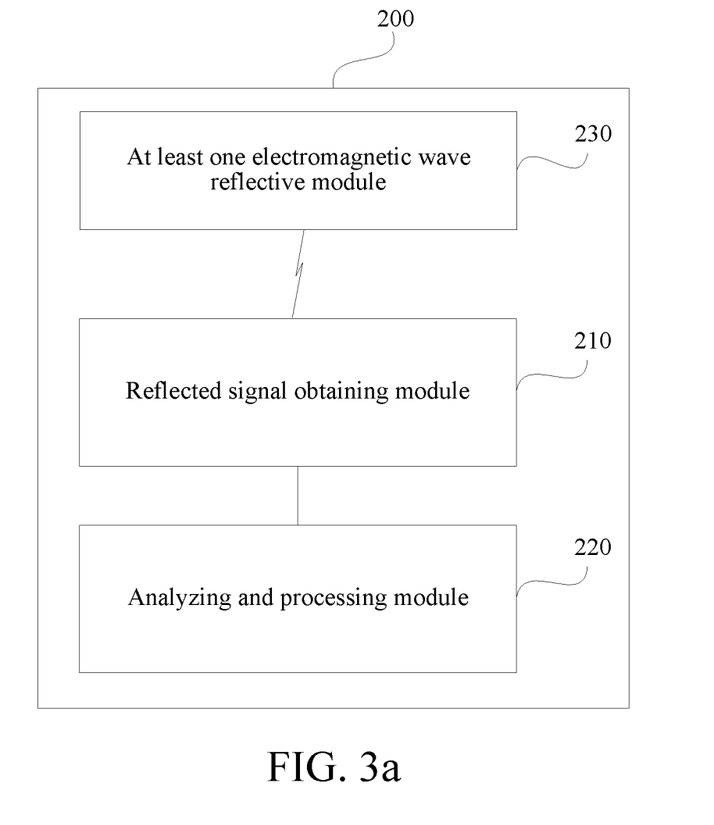
FIG. 3a, FIG. 3b, FIG. 3e, and FIG. 3f are respectively schematic structural block diagrams of an apparatus for obtaining vibration information, according to an embodiment of the present application.

As shown in FIG. 3a, in a possible implementation, the apparatus 200 further comprises:

the at least one electromagnetic wave reflective module 230, configured to, when vibrating in response to the sound in the environment, reflect the electromagnetic wave signal to form the at least one reflected electromagnetic wave signal.

In the implementation of the present application, in one aspect, the electromagnetic wave reflective module 230 can vibrate in response to the sound in the environment, and in another aspect, the electromagnetic wave reflective module 230 can reflect the electromagnetic wave signal. An electromagnetic wave reflective surface of the electromagnetic wave reflective module can reflect the electromagnetic wave signal while vibrating, and because the sound causes a mechanical vibration of the electromagnetic wave reflective surface, according to the Doppler's principle, the vibration changes a spectrum characteristic of the reflected electromagnetic wave signal, so that a signal with a frequency modulation characteristic is formed.

In a possible implementation, in an application scenario where sounds need to be collected, the electromagnetic wave reflective module 230 can be set at a location where sounds need to be collected to reflect the electromagnetic wave signal.

In a possible implementation, the at least one electromagnetic wave reflective module 230 comprises an electromagnetic wave reflective film.

In a possible implementation, in order to obtain a corresponding electromagnetic wave reflective characteristic, a printed antenna is also disposed on the electromagnetic wave reflective film.

In a possible implementation, the electromagnetic wave reflective film can be a metallic film for example. In other possible implementations, the electromagnetic wave reflective film can be a film of another material, and the printed antenna is disposed on the reflective surface.

In a possible implementation, the reflecting comprises directional reflecting. That is, directional reflecting the reflected electromagnetic wave signal to a location where a receiving end (for example, the signal receiving unit 211 described below) of the reflected electromagnetic wave signal is located.

In a possible implementation, the directional reflecting can be implemented by using a shape of the electromagnetic wave reflective module. For example, in a possible implementation, the electromagnetic wave reflective module 230 is an electromagnetic wave reflective film with a reflective surface having a curved surface, and the receiving end of the reflected electromagnetic wave signal is located at a reflection convergence region of the curved surface. In a possible implementation, the curved surface can be a paraboloidal or ellipsoidal surface.

In a possible implementation, the electromagnetic wave signal comprises an environmental electromagnetic wave signal. That is, in the implementation, there is no need to emit another electromagnetic wave signal for reflecting, and the reflected electromagnetic wave signal can be formed by reflecting the existing environmental electromagnetic wave signal in the environment. A person skilled in the art may see that, in the implementation, existing electromagnetic field information in the space can be reused and there is no need to emit an electromagnetic signal.

In another possible implementation, the electromagnetic wave signal comprises a modulated electromagnetic wave signal modulated by an orbital angular momentum.

Figure 3B:
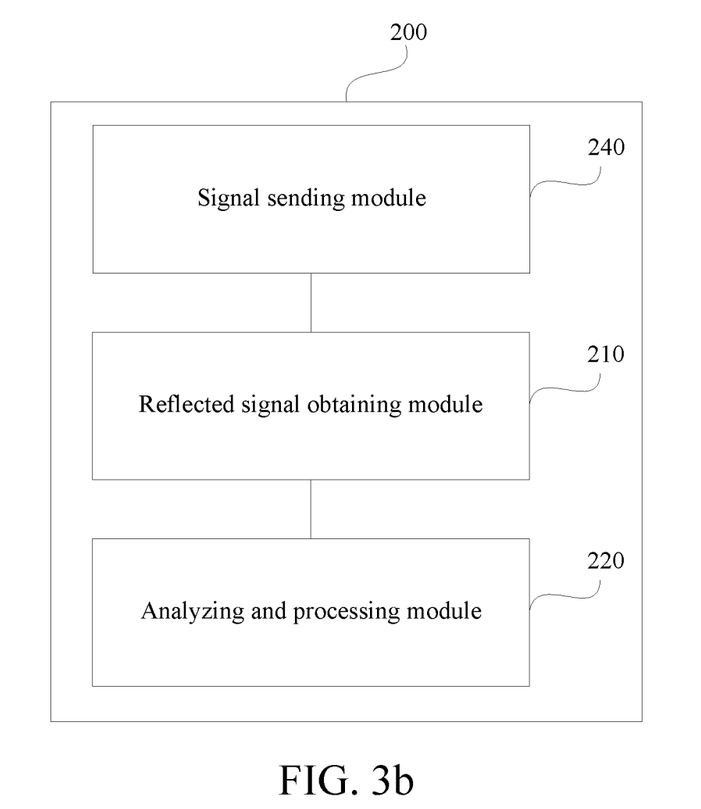
Figure 3C:
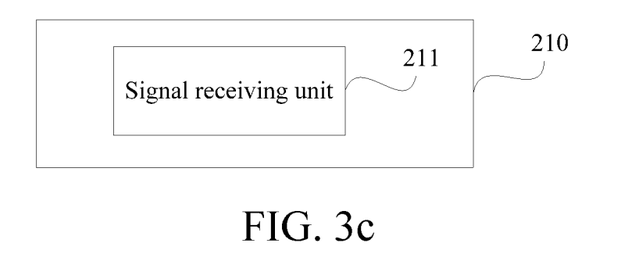
FIG. 3c and FIG. 3d are schematic structural block diagrams of a reflected signal obtaining module of an apparatus for obtaining vibration information, according to an embodiment of the present application.

As shown in FIG. 3b, in the possible implementation, the apparatus 200 further comprises:

a signal sending module 240, configured to send the modulated electromagnetic wave signal;

wherein the at least one reflected electromagnetic wave signal comprises an electromagnetic wave component conjugated with the modulated electromagnetic wave signal.

In the implementation, by using a characteristic of the modulated electromagnetic wave signal, interference brought by a source signal of the emitting end may be avoided. For details, refer to the corresponding description in the embodiment shown in FIG. 1.

As shown in FIG. 3c, in a possible implementation, the reflected signal obtaining module 210 comprises:

a signal receiving unit 211, configured to receive the at least one reflected electromagnetic wave signal.

Figure 3D:
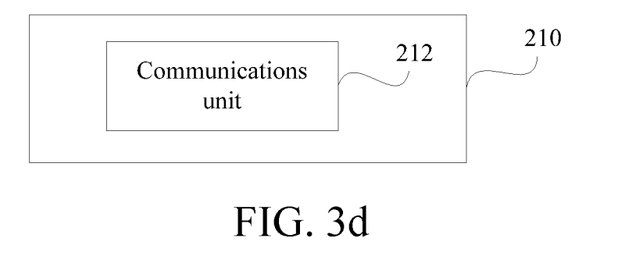

As shown in FIG. 3d, in another possible implementation, the reflected signal obtaining module 210 comprises:

a communications unit 212, configured to obtain the at least one reflected electromagnetic wave signal from an external device (for example, the signal receiving unit 211 described above).

In a possible implementation, the analyzing and processing module 220 can restore, by using changes of spectrum distribution of the at least one reflected electromagnetic wave signal, the vibration information of the electromagnetic wave reflective module by utilizing a classic frequency modulation and demodulation method or a machine learning method.

Figure 3E:
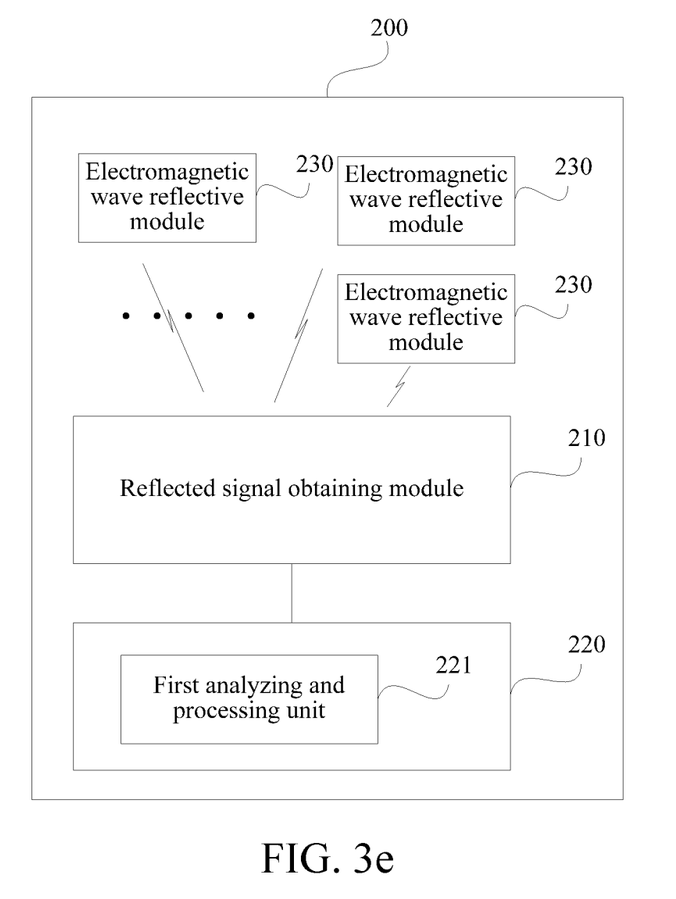

As shown in FIG. 3e, in a possible implementation, the at least one electromagnetic wave reflective module 230 is multiple electromagnetic wave reflective modules 230.

The signal receiving unit 211 can be configured to receive multiple reflected electromagnetic wave signals reflected by the multiple electromagnetic wave reflective modules 230.

In order to obtain vibration information of different locations by using the signal receiving unit 211, in a possible implementation, electromagnetic wave reflective characteristics of the multiple electromagnetic wave reflective modules 230 are different and correspond to multiple different locations. In a possible implementation, the different electromagnetic wave reflective characteristics can be obtained by using patterns of the printed antenna described above.

After the multiple reflected electromagnetic wave signals are obtained, the electromagnetic wave reflective modules respectively corresponding to the multiple reflected electromagnetic wave signals can be determined according to spectrum locations of the multiple reflected electromagnetic wave signals and the electromagnetic wave reflective characteristics respectively corresponding to the multiple electromagnetic wave reflective modules, so that vibration information of locations where each electromagnetic wave reflective module is located can be obtained.

As shown in FIG. 3e, in the possible implementation, the analyzing and processing module 220 comprises:

a first analyzing and processing unit 221, configured to analyze the multiple reflected electromagnetic wave signals to obtain multiple pieces of vibration information corresponding to the multiple locations.

In the implementation, based on different electromagnetic wave reflective characteristics, it is determined that, according to spectrum characteristics of the multiple received reflected electromagnetic wave signals, each reflected electromagnetic wave signal is reflected by which electromagnetic wave reflective module 230. In addition, because the location of each electromagnetic wave reflective module 230 is known, the vibration information of the multiple locations can be obtained, and then sounds at the multiple locations are obtained.

Figure 3F:
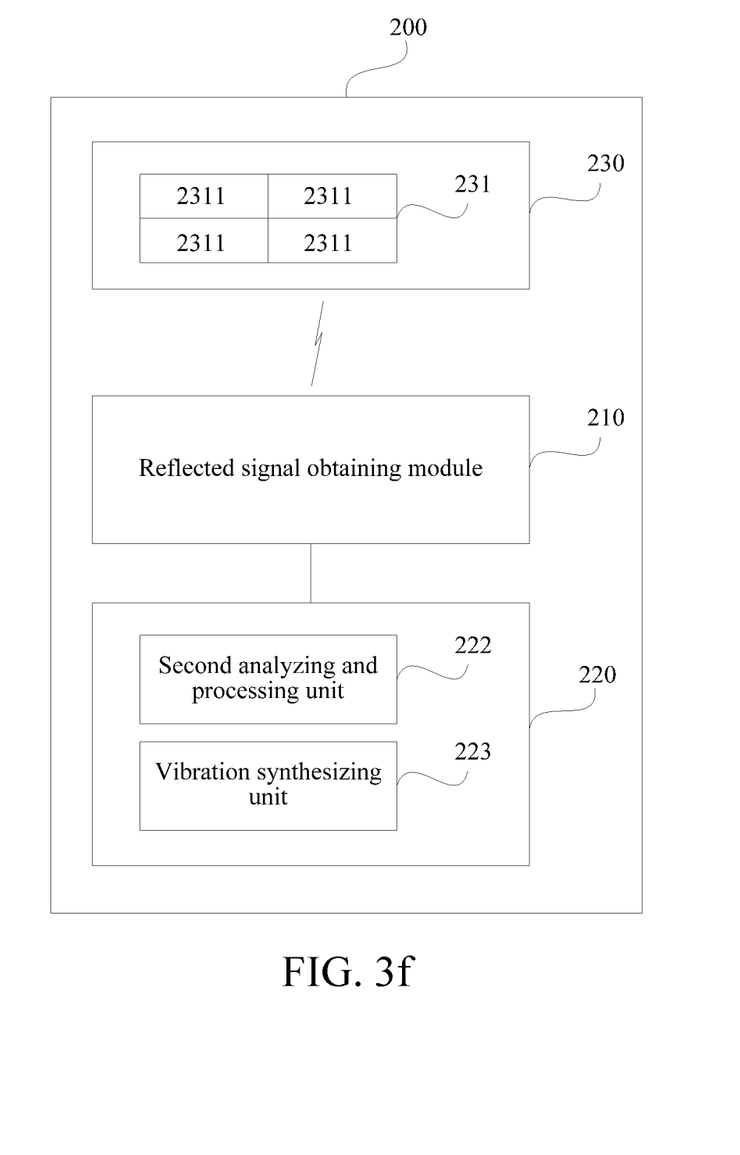

As shown in FIG. 3f, in a possible implementation, the at least one electromagnetic wave reflective module 230 comprises at least one electromagnetic wave reflective array 231, wherein each electromagnetic wave reflective array comprises multiple reflective units 2311 with different vibration response characteristics;

the reflected signal obtaining module 210 is further configured to obtain: the at least one reflected electromagnetic wave signal comprising at least one group of array reflected electromagnetic wave signals corresponding to the at least one electromagnetic wave reflective array;

wherein each group of array reflected electromagnetic wave signals comprises multiple reflected electromagnetic wave sub-signals respectively corresponding to the multiple reflective units of the corresponding electromagnetic wave reflective array.

In a possible implementation, for example, when the multiple reflective units respectively correspond to sounds within multiple different spectrum ranges, the multiple pieces of the vibration component information respectively correspond to components within different frequency ranges of the sound in the environment.

As shown in FIG. 3f, in the possible implementation, the analyzing and processing module 220 comprises:

a second analyzing and processing unit 222, configured to analyze each group of array reflected electromagnetic wave signals of the at least one group of array reflected electromagnetic wave signals to obtain multiple pieces of vibration component information respectively corresponding to the corresponding multiple reflected electromagnetic wave sub-signals.

As shown in FIG. 3f, in a possible implementation, the analyzing and processing module 220 further comprises:

a vibration synthesizing unit 223, configured to obtain, according to the multiple pieces of the vibration component information corresponding to each electromagnetic wave reflective array, synthesized vibration information of the sound located at each electromagnetic wave reflective array.

By using the implementation, the sound in the environment can be restored more completely in a wider frequency range, which results in better effect of the restored sound.

For further function implementations of modules and units of the apparatus 200 of the embodiment of the present application, refer to the corresponding descriptions in the embodiment shown in FIG. 1, which are not described again herein.

Figure 4:
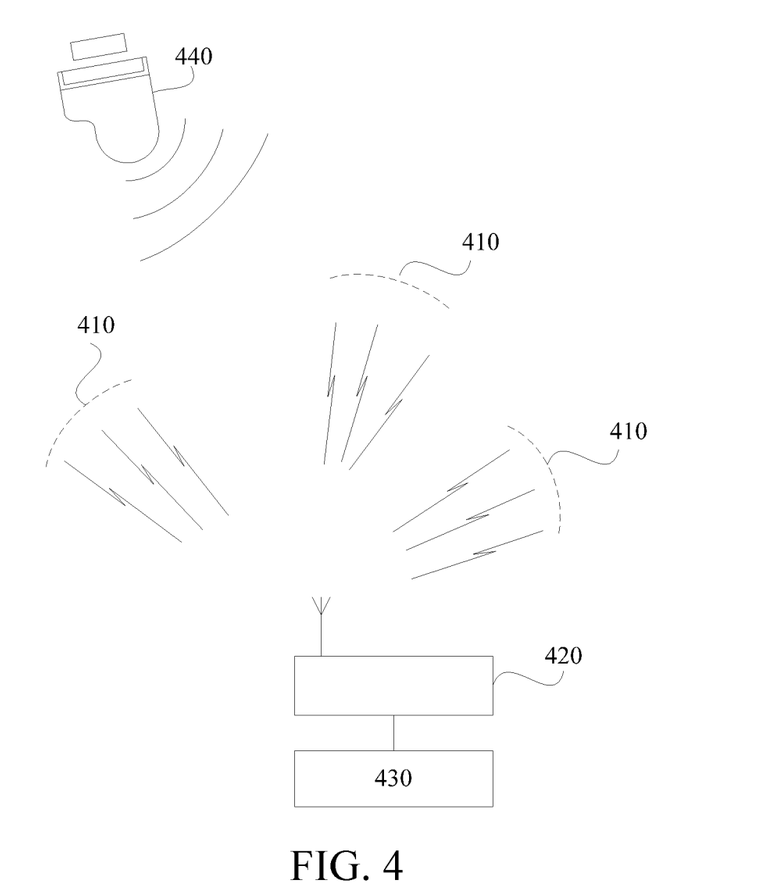
FIG. 4 is a schematic diagram of an application scenario of an apparatus for obtaining vibration information, according to an embodiment of the present application.

FIG. 4 shows a schematic diagram of an application scenario of contactless sound collection of sounds came from a musical instrument 440 according to an embodiment of the present application.

In the implementation, an apparatus according to the embodiment of the present application comprises:

multiple electromagnetic wave reflective modules 410, wherein each electromagnetic wave reflective module 410 is an electromagnetic wave reflective array, which comprises multiple reflective units with different vibration response characteristics respectively;

a reflected signal obtaining module 420, configured to receive multiple groups of array reflected electromagnetic wave signals reflected by the multiple electromagnetic wave reflective modules 410; and an analyzing and processing module 430, configured to analyze and process the multiple groups of array reflected electromagnetic wave signals to obtain synthesized vibration information located at each electromagnetic wave reflective module 410.

It can be seen from FIG. 4 that, a sound came from the musical instrument 440 makes the multiple electromagnetic wave reflective modules 410 vibrate, and the multiple electromagnetic wave reflective modules 410 directionally reflect the multiple groups of array reflected electromagnetic wave signals to the reflected signal obtaining module 420 while vibrating. After the reflected signal obtaining module 420 obtains the multiple groups of array reflected electromagnetic wave signals, the analyzing and processing module 430 analyzes and processes the multiple groups of array reflected electromagnetic wave signals, and then obtains vibration information located at each electromagnetic wave reflective module 410.

By using the implementation, vibration information of a sound within a wider frequency range can be obtained at multiple locations.

Figure 5:
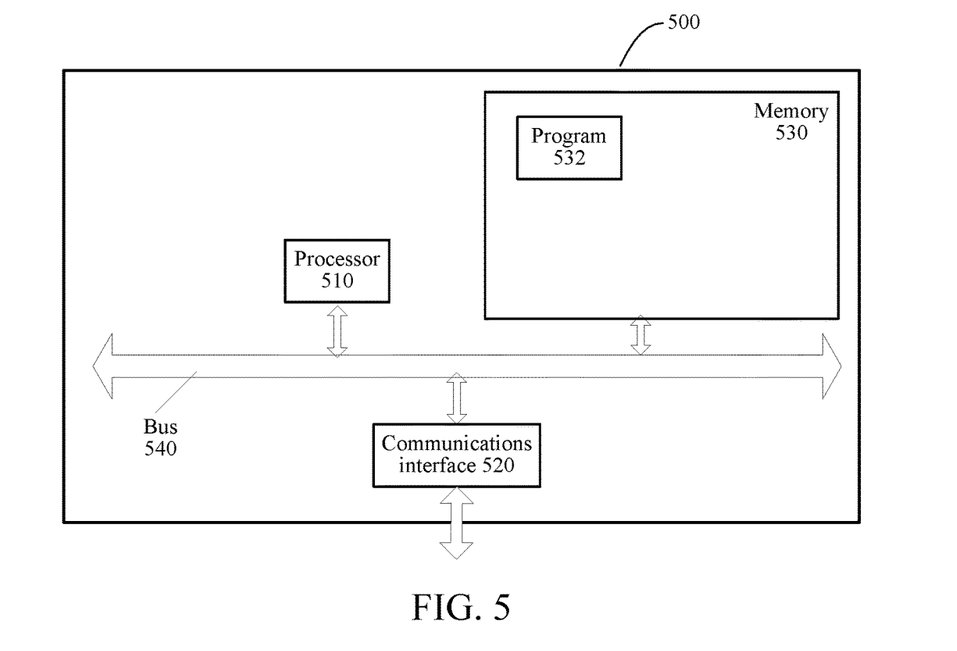
FIG. 5 is a schematic structural block diagram of an apparatus for obtaining vibration information, according to an embodiment of the present application.

FIG. 5 is a schematic structural diagram of another apparatus 500 for obtaining vibration information according to an embodiment of the present application. Specific embodiments of the present application are not intended to limit the specific implementation of the apparatus 500 for obtaining vibration information. As shown in FIG. 5, the apparatus 500 for obtaining vibration information can comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532. Specifically, the processor 510 can perform relevant steps in the foregoing method embodiment.

Specifically, the program 532 can comprise program code, wherein the program code comprises a computer operation instruction.

The processor 510 can be a central processing unit (CPU), an application specific integrated circuit (ASIC), or one or more integrated circuits configured to implement the embodiments of the present application.

The memory 530 is configured to store the program 532. The memory 530 can include a high-speed RAM memory, or can further include a non-volatile memory, for example, at least one disk memory. The program 532 can be specifically used to cause the apparatus 500 for obtaining vibration information to perform the following steps:

obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and analyze the at least one reflected electromagnetic wave signal to obtain at least one piece of vibration information corresponding to the at least one reflected electromagnetic wave signal.

For specific implementations of the steps in the program 532, refer to the corresponding descriptions of corresponding steps and units in the foregoing embodiments, which are not described herein again. It may be clearly understood by a person skilled in the art that, for the purpose of convenient and brief description, for detailed working procedures of the foregoing devices and modules, reference may be made to the description of corresponding procedures in the foregoing method embodiments, and details are not described herein again.

Figure 6:
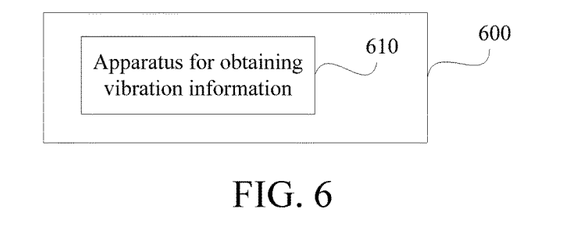
FIG. 6 is a schematic structural block diagram of user equipment, according to an embodiment of the present application.

As shown in FIG. 6, a possible implementation of an embodiment of the present application further provides user equipment 600, which comprises the apparatus 610 for obtaining vibration information described in the embodiments shown in FIG. 2, FIG. 3a to FIG. 3f, FIG. 4 or FIG. 5.

The user equipment 600 includes, but is not limited to, a smart phone, a computer, a tablet, a home gateway, and the like.

In at least one implementation solution of the embodiments of the present application, by obtaining and analyzing the reflected electromagnetic wave signal, the sound vibration at the electromagnetic wave reflective module in the environment can be restored, and obtaining sound information in an environment by using a wireless electromagnetic wave is especially applicable to some scenarios where an active component is not suitable for use at a sound collecting location and a scenario where sound information at multiple locations needs to be collected in a space.

A person of ordinary skill in the art may be aware that, in combination with the examples described in the embodiments disclosed in this specification, units and method steps can be implemented by electronic hardware or a combination of computer software and electronic hardware. Whether these functions are executed as hardware or software depends upon the particular application and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiment of the present application. The foregoing storage medium includes: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method for obtaining vibration information, comprising:
obtaining at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and
analyzing the at least one reflected electromagnetic wave signal to obtain at least one piece of vibration information corresponding to the at least one reflected electromagnetic wave signal,
wherein the electromagnetic wave signal comprises a modulated electromagnetic wave signal modulated by an orbital angular momentum, and each reflected electromagnetic wave signal of the at least one reflected electromagnetic wave signal includes an electromagnetic wave component conjugated with the modulated electromagnetic wave signal.

2. The method of claim 1, wherein the reflecting comprises directional reflecting.

3. The method of claim 1, wherein
the at least one reflected electromagnetic wave signal comprises multiple reflected electromagnetic wave signals corresponding to multiple electromagnetic wave reflective modules with different electromagnetic wave reflective characteristics, and
the multiple electromagnetic wave reflective modules correspond to multiple locations.

4. The method of claim 3, wherein the analyzing the at least one reflected electromagnetic wave signal comprises:
analyzing the multiple reflected electromagnetic wave signals to obtain multiple pieces of vibration information corresponding to the multiple locations.

5. The method of claim 1, wherein the at least one electromagnetic wave reflective module comprises at least one electromagnetic wave reflective array, each electromagnetic wave reflective array including multiple reflective units with different vibration response characteristics respectively; and
wherein the at least one reflected electromagnetic wave signal comprises at least one group of array reflected electromagnetic wave signals corresponding to the at least one electromagnetic wave reflective array, each group of array reflected electromagnetic wave signals including multiple reflected electromagnetic wave sub-signals respectively corresponding to the multiple reflective units of the corresponding electromagnetic wave reflective array.

6. The method of claim 5, wherein the analyzing the at least one reflected electromagnetic wave signal comprises:
analyzing each group of array reflected electromagnetic wave signals of the at least one group of array reflected electromagnetic wave signals to obtain multiple pieces of vibration component information respectively corresponding to the corresponding multiple reflected electromagnetic wave sub-signals.

7. The method of claim 6, wherein the analyzing the at least one reflected electromagnetic wave signal comprises:
obtaining, according to the multiple pieces of the vibration component information corresponding to each electromagnetic wave reflective array, synthesized vibration information of the sound located at each electromagnetic wave reflective array.

8. The method of claim 1, wherein the electromagnetic wave signal comprises an environmental electromagnetic wave signal.

9. The method of claim 1, further comprising:
forming, when the at least one electromagnetic wave reflective module vibrates in response to the sound in the environment, the at least one reflected electromagnetic wave signal by reflecting the electromagnetic wave signal by the at least one electromagnetic wave reflective module.

10. An apparatus for obtaining vibration information, comprising:
- a reflected signal obtaining module, configured to obtain at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and
- an analyzing and processing module, configured to analyze the at least one reflected electromagnetic wave signal to obtain at least one piece of vibration information corresponding to the at least one reflected electromagnetic wave signal,
- wherein the electromagnetic wave signal comprises a modulated electromagnetic wave signal modulated by an orbital angular momentum, and
- wherein the apparatus further comprises a signal sending module configured to send the modulated electromagnetic wave signal, and each reflected electromagnetic wave signal of the at least one reflected electromagnetic wave signal comprises an electromagnetic wave component conjugated with the modulated electromagnetic wave signal.

11. The apparatus of claim 10, wherein the reflected signal obtaining module is further configured to:
- obtain multiple reflected electromagnetic wave signals corresponding to multiple electromagnetic wave reflective modules with different electromagnetic wave reflective characteristics, and
- the multiple electromagnetic wave reflective modules correspond to multiple locations.

12. The apparatus of claim 11, wherein the analyzing and processing module comprises:
- a first analyzing and processing unit, configured to analyze the multiple reflected electromagnetic wave signals to obtain multiple pieces of vibration information corresponding to the multiple locations.

13. The apparatus of claim 10, wherein
the at least one electromagnetic wave reflective module comprises at least one electromagnetic wave reflective array, each electromagnetic wave reflective array including multiple reflective units with different vibration response characteristics respectively; and
the reflected signal obtaining module is further configured to obtain the at least one reflected electromagnetic wave signal comprising at least one group of array reflected electromagnetic wave signals corresponding to the at least one electromagnetic wave reflective array, each group of array reflected electromagnetic wave signals comprising multiple reflected electromagnetic wave sub-signals respectively corresponding to the multiple reflective units of the corresponding electromagnetic wave reflective array.

14. The apparatus of claim 13, wherein the analyzing and processing module comprises:
- a second analyzing and processing unit, configured to analyze each group of array reflected electromagnetic wave signals of the at least one group of array reflected electromagnetic wave signals to obtain multiple pieces of vibration component information respectively corresponding to the corresponding multiple reflected electromagnetic wave sub-signals.

15. The apparatus of claim 14, wherein the analyzing and processing module further comprises:
- a vibration synthesizing unit, configured to obtain, according to the multiple pieces of the vibration component information corresponding to each electromagnetic wave reflective array, synthesized vibration information of the sound located at each electromagnetic wave reflective array.

16. The apparatus of claim 10, wherein the electromagnetic wave signal comprises an environmental electromagnetic wave signal.

17. The apparatus of claim 10,
wherein the at least one electromagnetic wave reflective module is configured to, when vibrating in response to the sound in the environment, reflect the electromagnetic wave signal to form the at least one reflected electromagnetic wave signal.

18. The apparatus of claim 17, wherein the at least one electromagnetic wave reflective module comprises at least one electromagnetic wave reflective film.

19. The apparatus of claim 17, wherein the at least one electromagnetic wave reflective module is further configured to:
- when vibrating in response to the sound in the environment, reflect the electromagnetic wave signal to form the at least one reflected electromagnetic wave signal.

20. The apparatus of claim 19, wherein each electromagnetic wave reflective module of the at least one electromagnetic wave reflective module comprises a curved reflective surface, configured to perform the directional reflecting.

21. A user apparatus, comprising the apparatus for obtaining vibration information of claim 10.

22. A computer readable storage device comprising executable instructions that, in response to execution, cause a device comprising a processor to perform operations, comprising:
- obtaining at least one reflected electromagnetic wave signal, wherein the at least one reflected electromagnetic wave signal is formed by reflecting an electromagnetic wave signal by at least one electromagnetic wave reflective module when the at least one electromagnetic wave reflective module vibrates in response to a sound in an environment; and
- analyzing the at least one reflected electromagnetic wave signal to obtain at least one piece of vibration information corresponding to the at least one reflected electromagnetic wave signal,
- wherein the electromagnetic wave signal comprises a modulated electromagnetic wave signal modulated by an orbital angular momentum, and each reflected electromagnetic wave signal of the at least one reflected electromagnetic wave signal includes an electromagnetic wave component conjugated with the modulated electromagnetic wave signal.

* * * * *